United States Patent [19]

Suzuki et al.

[11] Patent Number: 4,500,672
[45] Date of Patent: Feb. 19, 1985

[54] RUBBER COMPOSITION COMPRISING FURNACE CARBON BLACK

[75] Inventors: Hiroaki Suzuki; Shinji Misono, both of Aichi, Japan

[73] Assignee: Tokai Carbon Co., Ltd., Tokyo, Japan

[21] Appl. No.: 548,128

[22] Filed: Nov. 2, 1983

[30] Foreign Application Priority Data

Oct. 11, 1982 [JP] Japan ................... 57-196022

[51] Int. Cl.³ ............................. C08K 3/04
[52] U.S. Cl. ......................... 524/496; 106/307; 423/445; 423/460; 423/461; 524/525
[58] Field of Search ........... 524/496; 106/307; 260/763; 423/445, 460, 461

[56] References Cited

U.S. PATENT DOCUMENTS

| | | | |
|---|---|---|---|
| 3,565,657 | 2/1971 | Dannenberg et al. | 106/307 |
| 3,596,031 | 7/1971 | Murakoshi et al. | 252/511 |
| 3,725,103 | 4/1973 | Jordan et al. | 106/307 |
| 4,381,949 | 5/1983 | Kuhner et al. | 106/307 |
| 4,383,074 | 5/1983 | Kuan | 524/496 |
| 4,398,582 | 8/1983 | Yuto et al. | 524/496 |

OTHER PUBLICATIONS

Derwent Abstract 60224 E/29 (J57094030), 6-1982.
Derwent Abstract 74553 D/41 (J56106936), 8-1981.
Derwent Abstract 78802 A/44 (J53109546), 9-1978.

*Primary Examiner*—Herbert J. Lilling
*Attorney, Agent, or Firm*—Armstrong, Nikaido, Marmelstein & Kobovcik

[57] ABSTRACT

According to this invention, a rubber composition is provided, which comprises 100 parts by weight of a rubber component and 25 to 250 parts by weight of carbon black, which carbon black falls within the property range of an electron-microscopic average particle diameter (dn) of above 31 millimicron, an iodine adsorption number of 35 to 60 mg/g and a dibutyl phthalate absorption number (DBP) of 90 to 150 ml/100 g and further has a selected property such that the Dst mode diameter (m$\mu$) is below the value (m$\mu$) obtained from the following equation:

$$Dst = 2.65 \times dn + 0.64 \times DBP - 27.56$$

5 Claims, No Drawings

RUBBER COMPOSITION COMPRISING FURNACE CARBON BLACK

BACKGROUND OF THE INVENTION (1) Field of the Invention

This invention relates to a rubber composition and more particularly to a rubber composition containing a carbon black having selected properties and furnished with both a low heat build-up property and a high reinforcing property.

(2) Description of the Prior Art

Heretofore, a particle diameter (or a specific surface area) determined by an electron-microscopic method, a BET nitrogen adsorption method or an iodine adsorption method, and a structure given by a dibutyl phthalate absorption number have been important properties for carbon black used in rubber compounds. However, there has been a contradictory relationship between these typical properties, i.e., particle diameter and structure, and the properties of a rubber composition, especially low heat build-up property and high reinforcing property which are necessary for a rubber composition used in car tire carcasses and undertreads, in that the heat build-up is lowered and improved, while the reinforcing property is deteriorated as the carbon black particle becomes larger or the structure becomes smaller.

For this reason, it has been thought extremely difficult to effect lowering of the heat build-up of a rubber composition and at the same time furnishing a high reinforcing property.

As a result of a study made with attention paid to the fact that the interaction between a rubber component and compounded carbon black is influenced markedly by characteristics other than the particle diameter and structure of the carbon black, the applicant of this invention has found that an increase in tinting strength efficiently contributes toward increasing a reinforcing property and, on the basis of this finding, previously succeeded in developing a rubber composition which is furnished with both a low heat build-up and a high reinforcing property by imparting a selected property of tint strength of above 175 to a soft carbon black in a low heat build-up-imparting range having an electron-microscopic average particle diameter (dn) of about 31 millimicron, an iodine adsorption number of 40 to 60 mg/g, and a low DBP absorption number of 90 to 130 ml/100 g [Japanese Patent No. 1032175 (Japanese Patent Publication No. 13461/1979)].

However, this carbon black showed a behavior of heightening the Mooney viscosity of a rubber composition, depending on the condition for compounding, and has a problem of practice that smooth milling or extrusion is sometimes prevented.

SUMMARY OF THE INVENTION

It is an object of this invention to provide a rubber composition furnished with both a low heat build-up and a high reinforcing property and further maintained at a low Mooney viscosity.

It is another object of this invention to provide a rubber composition excellent in milling or extrusion process abilities such as kneading, extrusion or molding, and useful in the production of a variety of rubber articles such as car tires.

These objects of this invention can be achieved by compounding 100 parts by weight of a rubber component with 25 to 250 parts by weight of carbon black which belongs to a furnace carbon black having the property range of an electron-microscopic average particle diameter (dn) of above 31 millimicron, an iodine adsorption number of 35 to 60 mg/g, and a dibutyl phthalate absorption number (DBP) of 90 to 150 ml/100 g, and which has a selected property in that the Dst mode diameter (m$\mu$) is beow the value obtained from the following equation;

$$Dst = 2.65 \times dn + 0.64 \times DBP - 27.56$$

DESCRIPTION OF THE PREFERRED EMBODIMENTS

The furnace carbon black of this invention has an electron-microscopic average particle diameter (dn) of above 31 millimicron, an iodine adsorption number of 35 to 60 mg/g and a dibutyl phthalate absorption number (DBP) of 90 to 150 ml/100 g.

When the dn is smaller than 31 millimicron, lowered processability or increased viscosity, lowered dynamic properties will result and, therefore, such a condition is not preferred. Further, when the iodine adsorption number is below 35 mg/g, a decrease in reinforcing property becomes large, whereas when it is above 60 mg/g, the low heat build-up property is adversely affected, though the reinforcing property can be greatly improved and thus such conditions are not preferred.

On the other hand, when the DBP is smaller than 90 ml/100 g, there arises a drawback of lowering of the dispersibility and processability of a polymer, whereas when it is larger than 150 ml/100 g, the milling property of rubber is worsened.

These furnace carbon blacks are those belonging to the property range for usual FEF or MAF class, soft carbon black. Although they can provide a low heat build-up property suitable for a rubber composition for use in car tire carcasses and undertreads, they tends toward lowering the reinforcing property.

In this invention, use is made of a furnace carbon black which has a selected property in that the Dst mode diameter (m$\mu$) is below the value obtained from the equation:

$$Dst = 2.65 \times dn + 0.64 \times DBP - 27.56$$

in addition to the above-described properties.

When the Dst mode diameter is above the value obtained from the above equation, no increase in the reinforcing property can be obtained, so that such a condition is not preferred.

The furnace carbon blacks which can satisfy all of these properties can provide a rubber composition having a hardness and tensile strength comparable to those obtained by compounding an HAF class, hard carbon black.

Namely, the aggregate size of conventional carbon blacks increases with an increase in a particle diameter (dn) and DBP absorption number and the following relationship holds among the Dst mode diameter which represents the size of aggregate, dn and DBP:

$$Dst = 2.65 \times dn + 0.64 DBP - 27.56$$

However, the carbon black of this invention has a Dst mode diameter significantly smaller than that calculated using this equation.

In other words, the aggregate of the carbon black of this invention is much smaller than that empirically derived from the dn's and DBP absorption number of conventional carbon blacks. The fact that the size of an aggregate corresponding to these particle diameter and DBP adsorption number is smaller than that of the conventional one directly contributes to an increase in a rubber-reinforcing property.

The carbon black furnished with all the above-described properties can be produced by an oil furnace process which is basically the same as that described in the aforementioned Japanese Patent No. 1032175 (Japanese Patent Publication No. 13461/1979). Namely, the vapor of a hydrocarbon feedstock is quickly pyrolyzed in a high-temperature combustion gas stream obtained by burning a hydrocarbon fuel with a suitable oxidizing agent containing air or oxygen, the pyrolysis product is immediately cooled by water spraying, and the floating carbon black formed is separated and recovered.

In this case, the combustion chamber for producing a high-temperature combustion gas has a heat-resistant construction which can withstand a thermal load as high as above 1,700° C., but the shape of the furnace and the reaction conditions differ in the following points.

Namely, the combustion chamber is converged at its downstream and connected contiguously to a relatively short reduced diameter portion, and the reaction zone is a tapered tube gradually enlarging from the reduced diameter portion.

The most distinguishing reaction condition is the formation of a vigorous turbulent air flow in the furnace by maintaining swirling power of the combustion air introduced into the combustion chamber at a swirl number of above 0.6.

When the swirl number is smaller than 0.6, the formation of the turbulent gas flow becomes insufficient unfavorably.

This condition falls within an extremely high range of swirling power, since the swirl number in the production process of the prior application (Japanese Patent No. 1032175) is as high as about 0.30.

While using the above-described furnace and the reaction conditions, a high-aromatic content feedstock such as creosote oil or ethylene bottom oil is injected through an atomizing nozzle inserted into the furnace head in the direction of the furnace axis, into a high-temperature combustion gas passing the reduced diameter portion at a high speed. In this case, the carbon black formed is furnished with properties including an electron-microscopic average particle diameter (dn) of above 31 millimicron, an iodine adsorption number of 40 to 60 mg/g and a DBP absorption number of 90 to 150 ml/100 g, by controlling a ratio of the total air feed to the sum of the material oil and the fuel oil, the combustion rate of the fuel oil, the flow rate of the combustion gas at the point of material oil introduction, etc.

Moreover, the carbon black formed is furnished with a characteristic in that the Dst mode diameter is below the value calculated from the equation:

$$Dst = 2.65 \times dn + 0.64 \times DBP - 27.56$$

by contacting the carbon black intermediate formed by the pyrolysis of feedstock with a turbulent gas flow formed from combustion air of a high swirling power so as to prevent its unnecessary and improper deposition in the tapered reaction zone, and quenching it so that the residence time of the pyrolysis product gas stream in the furnace is 340 to 380 milliseconds.

When the residence time of the pyrolysis product gas stream in the furnace is below 340 milliseconds, the quality of the carbon black formed becomes poor because of the formation and deposition of coke, etc., whereas when it is above 380 milliseconds, the Dst mode diameter can not be reduced to below a value obtained from the equation:

$$Dst = 2.65 \times dn + 0.64 \times DBP - 27.56$$

and, therefore, such conditions are not preferred.

The compounding ratio of the carbon black having these properties is such that 25 to 250 parts by weight of the carbon black is present per 100 parts by weight of a rubber component, or preferably, 40 to 80 parts by weight of the carbon black is present per 100 parts by weight of a rubber component.

When the compounding ratio of the carbon black is below 25 parts by weight, no sufficient rubber-reinforcing effect of the carbon black can be obtained, and the precious improving effect of the carbon black is weakened unfavorably.

When the compounding ratio is above 250 parts by weight, the reinforcing effect is markedly lowered, and no improving effect of the carbon black can be obtained also in this case.

As the rubber component, natural rubber, a synthetic rubber such as styrene/butadiene rubber, polybutadiene rubber, isoprene rubber of isobutylene/isoprene rubber can be used. Further, usual additives such as vulcanizing agent, vulcanization accelerator, antioxidant, vulcanization aid, softener and plasticizer are added.

As mentioned above, the rubber composition of this invention has a low heat build-up and a high resiliency comparable to that realized when a usual FEF (N 550) class, soft carbon black is compounded, and at the same time, has a relatively high-level reinforcing property far better than that realized when a usual FEF (N 550) class, soft carbon black is compounded.

Further, the Mooney viscosity of the rubber composition of this invention can always be controlled at a low level, so that milling, extrusion and molding can proceed extremely smoothly.

Accordingly, in view of the above-mentioned improving effect on milling and extrusion processing, the rubber composition of this invention is extremely useful in the production of a variety of rubber articles including car tires.

Next, description is made of the measurement of the properties of the carbon black of this invention and the evaluation of a rubber composition.

(1) Electron-microscopic average particle diameter (dn)

A carbon black sample was dispersed in chloroform for 30 minutes in an ultrasonic cleaning machine at a frequency of 28 kHz, and the dispersed sample was fixed on a film on a specimen grid for supporting carbon.

This sample had its micrograph taken by an electron microscope (direct magnification × 20,000, total magnification 80,000 to 100,000). Above 1,000 randomly selected carbon black particles in the electron micrograph were measured for their diameters. Then, the arithmetical mean particle diameter (dn) was determined from a 3-mm interval histogram of the diameters.

(2) Iodine adsorption number

This value was determined according to the testing method for rubber-compounding carbon black, JIS K 6221 (1975), article 6.1.1. (corresponding to ASTM D 1510-81).

Namely, 0.5±0.0005 g of a dried carbon black sample was precisely weighed out into a 200 ml Erlenmeyer flask with a stopper, 25 ml of a 0.0473N iodine solution was added thereto, and the mixture was shaken for 1 minute at room temperature at a shaking number of above 120 strokes/min. The carbon black was separated and 20 ml of the filtrate was titrated with a 0.0394N sodium thiosulfate solution (a ml). Separately, a blank test was performed by the same procedure (b ml). The iodine adsorption number per g of the dried carbon black was calculated according to the following equation:

$$IA = (b-a)/b \times (V/W_D) \times N \times 126.91 \times f$$

wherein
  IA: iodine adsorption number (mg/g)
  $W_D$: weight of dry carbon black (g)
  V: amount of iodine solution added (ml)
  N: normality of iodine solution (0.047)
  f: factor of iodine solution.

(3) Dibutyl phthalate absorption number

This value was determined according to the testing method for rubber-compounding carbon black, JIS K 6221 (1975), article 6.1.2. Absorption Number Method A (corresponding to ASTM D 2414-82).

Namely, a definite amount of dried carbon black was placed in a mixing chamber of an absorptometer. When the torque of a rotor provided in the mixing chamber reached a predetermined value, a limit switch was actuated to stop automatically the dropping of dibutyl phthalate from a burette. The absorption number was calculated from the scale reading (V) of the burette according to the following equation:

$$DBP\ No. = V/W_D \times 100$$

wherein DBP
  No.: absorption number (ml/100 g)
  $W_D$: weight of dry carbon black (g).

(4) Dst mode diameter

A carbon black sample was dried according to JIS K 6221 (1975), article 6.2.1. Method B, then precisely weighted out and mixed with a 20% aqueous ethanol solution containing a small amount of a surfactant (dispersing medium) to obtain a dispersion of a carbon black concentration of 100 mg/l. This dispersion was thoroughly dispersed by means of ultrasonic waves to form a sample solution for measurement.

A disk centrifuge (manufactured by Joyes Loebl Co., England) was set at a speed of 6,000 rpm. To this apparatus, a spin solution (a 2% aqueous glycerol solution) was added in an amount of 10 to 20 ml and then 1 ml of a buffer solution of an aqueous ethanol solution was poured.

Then, 0.5 to 1.0 ml of the above sample solution for measurement was injected by means of a syringe, and the centrifugation of the mixture was started and at the same time, the recorder was operated to prepare a distribution curve of aggregates. The Dst mode diameter was defined as the Stokes equivalent diameter (m$\mu$) of the mode (maximum absorbancy) of the distribution curve of the aggregates.

(5) Hardness (rubber composition) JIS K 6301

Hardness was determined by using a spring hardness meter type A and the following conditions:
  thickness of test piece: above 12 mm
  needle size: diameter of straight portion 1.30±0.1 mm
  diameter of tip: 0.79±0.02 mm
  cone vertical angle: 35°±0.25°
  distance from pressure-applied surface to tip:

$$2.54 \begin{array}{l} -0.00 \\ +0.05 \end{array} mm$$

spring characteristics: 0° C., 0.539N 100° C., 8.38N
The pressure-applied surface was contacted in parallel with the surface to be tested, the reading of the scale was immediately recorded, and this reading was adopted as the hardness of the test piece.

(6) Tensile strength (rubber composition)

This strength was measured according to ASTM D 412-80.

(7) Abrasion resistance (rubber composition)

A Lambourn abrasion tester (mechanical slip mechanism) was used, and the measurement was conducted under the following conditions:
  test piece: thickness 10 mm, outside diameter 44 mm
  Emery wheel: GC type, fineness 80, hardness H
  carborundum powder added: fineness #80, rate of addition about 9 g/min.
  speed of revolution of sample: 660 rpm
  test piece weight: 4 kg.

The values of abrasion resistance were represented by indices (%) of carbon black IRB #5 at a relative slip rate of 24% or 60%.

(8) Degree of heat build-up (rubber composition)

Degree of heat build-up was measured by a Goodrich Flexometer according to ASTM Method 623-67 A.

(9) Resilience (rubber composition) (JIS K 6301)

Resilience was measured by using a Lüpke type resilience tester [(Rubber Chem. Technol. 7, 59 (1934)].

The measurement conditions were as follows:
  test piece: thickness 12 mm, outside diameter 28 mm
  measurement temperature: 25° C.

(10) Elongation (rubber composition)

Elongation was measured according to ASTM D 412-80.

This invention will now be described in more detail with reference to examples.

EXAMPLES

Carbon black was produced by using a furnace consisting of a combustion chamber, a reduced diameter portion contiguous thereto, a gradually enlarging, tapered reaction zone contiguous to said reduced diameter portion, and a refractory brick-lined cylindrical wind box contiguous to said reaction zone.

The combustion chamber was converged at the downstream exit portion and had an inside diameter of 700 mm and a length of 1,000 mm.

The reduced diameter portion had an inside diameter of 150 mm and a length of 200 mm, and the tapered reaction chamber has a length of 9,000 mm. The furnace head had a tangentially mounted air supply inlet and the downstream of the reaction zone had a position-adjustable quenching nozzle. Further, into the upstream extremity of the combustion chamber were inserted along the direction of the axis of the furnace a combustion burner and an atomizing nozzle for a material oil.

The atomizing nozzle for material oil was inserted so that its tip portion was located at the inlet of the reduced diameter portion.

The carbon black was produced by using the above reaction furnace under the forming conditions shown in Table 1. The fuel oil used was a hydrocarbon having a specific gravity (15/4° C.) of 0.903, a viscosity (cSt at 50° C.) of 16.1, a residual carbon content of 5.4%, a sulfur content of 1.8%, and a flash point of 96° C., and the material oil used was a high-aromatic hydrocarbon oil having a specific gravity (15/4° C.) of 1.0703, a viscosity (Engler, 40/20° C.) of 2.10, a benzene-insoluble matter content of 0.03%, Bureau of Mines Correlation Index (BMCI) of 140 and an initial boiling point of 103° C.

TABLE 1

| Production Conditions | Run No. | | | | | |
|---|---|---|---|---|---|---|
| | 1 | 2 | 3 | 4 | 5 | 6 |
| Total air supply (Nm³/hr) | 2100 | 1900 | 1950 | 2340 | 2550 | 2000 |
| Fuel oil feed (kg/hr) | 119 | 108 | 111 | 143 | 145 | 91 |
| Fuel oil-atomizing air supply (Nm³/hr) | 100 | 100 | 100 | 140 | 100 | 100 |
| Fuel combustion rate (%) | 160 | 160 | 160 | 150 | 160 | 200 |
| Material oil feed (kg/hr) | 581 | 566 | 612 | 765 | 766 | 606 |
| Material oil-atomizing air supply (Nm³/hr) | 220 | 200 | 200 | 210 | 220 | 190 |
| Material oil initial injection flow rate (m/sec) | 260 | 245 | 251 | 240 | 250 | 220 |
| Combustion gas flow rate* (m/sec) | 220 | 197 | 201 | 262 | 289 | 95 |
| Furnace residence time** (msec) | 348 | 370 | 364 | 340 | 220 | 498 |
| Combustion air swirling force (swirl number) | 0.68 | 0.65 | 0.65 | 0.60 | 0.35 | 0.30 |

Notes:
*The flow rate of the combustion gas at the site of material oil introduction.
**The residence time to the water cooling point of the gas containing the formed carbon black.

The properties of each of the produced carbon blacks were compared with those of a conventionally available FEF (N 550) class soft carbon black, an HAF (N 330) class hard carbon black or an IRB #5 standard carbon black (example of a conventional carbon black) and the results are shown in Table 2.

Here, Runs No. 5 and No. 6 did not satisfy the requirements for the Dst mode diameter of this invention and therefore regarded as comparative examples.

TABLE 2

| Properties | Run No. | | | | | | | | |
|---|---|---|---|---|---|---|---|---|---|
| | Carbon black | | | | | | | | |
| | Exs. of this invention | | | | Compar. Exs. | | Exs. of conventional | | |
| | 1 | 2 | 3 | 4 | 5 | 6 | FEF[1] (N550) 7 | HAF[2] (N330) 8 | IRB[3] #5 9 |
| Electron-microscopic average particle diameter dn (mμ) | 43.6 | 44.0 | 46.0 | 38.9 | 38.5 | 44.0 | 42.6 | 29.8 | 29.0 |
| Iodine adsorption number (mg/g) | 50 | 47 | 48 | 45 | 45 | 45 | 44 | 80 | 80 |
| DBP absorption number (ml/100 g) | 123 | 130 | 110 | 108 | 105 | 125 | 115 | 101 | 100 |
| Tint strength (%) | 153 | 139 | 144 | 175 | 178 | 138 | 130 | 210 | 211 |
| Dst mode diameter (mμ) | 149 | 161 | 159 | 139 | 149 | 186 | 176 | 115 | 111 |
| $2.65 \times dn + 0.64 \times DBP - 27.56$ | 166.7 | 172.2 | 164.7 | 144.6 | 141.7 | 169.0 | 158.9 | 116.1 | 113.3 |

Notes:
[1]"Seast SO (a product of Tokai Carbon Co., Ltd.)"
[2]"Seast 3" (a product of Tokai Carbon Co., Ltd.)"
[3]ASTM standard Industry Reference Black No. 5

Each carbon black sample in Table 2 was compounded with a natural rubber component and a synthetic component at a compounding ratio shown in Table 3.

TABLE 3

| Compound components (Parts by weight) | Natural rubber | Synthetic rubber |
|---|---|---|
| Natural rubber (RSS #1) | 100 | — |
| Styrene/butadiene rubber (JSR 1712)* | — | 137.5 |
| Carbon black | 50 | 68.75 |
| Aromatic oil (softener) | 4.0 | — |
| Stearic acid (dispersing vulcanization aid) | 3.0 | 1.0 |
| Zinc oxide (vulcanization aid) | 5.0 | 3.0 |
| Dibenzothiazyl disulfide (vulcanization accelerator) | 1.0 | — |
| N—cyclohexyl-2-benzothiazolesulfenamide | — | 1.25 |
| Sulfur (vulcanizing agent) | 2.5 | 1.75 |

Note:
*a product of Nippon Gosei Gomu Co., Ltd.

Rubber compositions were obtained by vulcanizing the compounding components of Table 3 at 145° C. Their rubber properties were measured. The results are shown in Table 4, wherein Run Nos. correspond to those of the compounding carbon black sample of Table 2.

TABLE 4

| Test items | Exs. of this invention | | | | Compar. Exs. | | Exs. of conventional | | |
|---|---|---|---|---|---|---|---|---|---|
| | \multicolumn{9}{c}{Run No.} | | | | | | | | |
| | 1 | 2 | 3 | 4 | 5 | 6 | 7 (FEF) | 8 (HAF) | 9 (IRB #5) |
| (1) Properties of natural rubber composition | | | | | | | | | |
| Hardness (JIS, Hs) | 70 | 70 | 69 | 69 | 69 | 69 | 68 | 70 | 70 |
| Tensile strength (kg/cm$^2$) | 268 | 269 | 262 | 271 | 270 | 252 | 250 | 281 | 282 |
| Abrasion resistance (24% slip) | 76.9 | 76.4 | 75.4 | 76.5 | 75.4 | 74.9 | 73.5 | 101.2 | 100 |
| Abrasion resistance (60% slip) | 80.9 | 82.9 | 77.9 | 83.0 | 83.5 | 75.0 | 74.9 | 102.1 | 100 |
| Degree of heat build-up (°C.) | 25.5 | 26.0 | 26.3 | 27.1 | 29.2 | 26.2 | 26.8 | 32.3 | 32.5 |
| Resilience (%) | 59.4 | 59.4 | 60.8 | 59.6 | 57.0 | 61.3 | 61.8 | 54.3 | 54.7 |
| Elongation (%) | 460 | 455 | 460 | 460 | 450 | 451 | 455 | 490 | 485 |
| Mooney viscosity (ML$_{1+4}$, at 125° C.) | 76.7 | 76.8 | 75.7 | 76.9 | 80.3 | 75.3 | 74.6 | 81.0 | 80.0 |
| (2) Properties of synthetic rubber composition | | | | | | | | | |
| Hardness (JIS, Hs) | 60 | 60 | 58 | 60 | 59 | 58 | 58 | 61 | 60 |
| Tensile strength (kg/cm$^2$) | 213 | 204 | 202 | 215 | 215 | 195 | 196 | 220 | 230 |
| Abrasion resistance (24% slip) | 77 | 75 | 73 | 77 | 78 | 69 | 68 | 98 | 100 |
| Abrasion resistance (60% slip) | 77 | 78 | 73 | 77 | 77 | 72 | 64 | 99 | 100 |
| Degree of heat build-up (°C.) | 25.3 | 25.6 | 26.0 | 26.7 | 28.8 | 25.0 | 25.1 | 32.0 | 32.0 |
| Resilience (%) | 45.5 | 46.0 | 46.6 | 45.1 | 44.2 | 48.0 | 46.9 | 42.0 | 41.0 |
| Elongation (%) | 545 | 535 | 555 | 545 | 530 | 529 | 550 | 570 | 570 |
| Mooney viscosity (ML$_{1+4}$, at 125° C.) | 38.5 | 38.6 | 37.7 | 38.7 | 40.0 | 37.8 | 36.0 | 41.5 | 41.0 |
| Overall evaluation by Garvey die extrusion* | 7A | 7A | 7A | 6A | 5A | 7A | 7A | 5A | 5A |

(Note)
*evaluated according to ASTM D 2230-78 Method A

From the results of Table 4, it was recognized that the rubber compositions of this invention (Run Nos. 1 through 4) had comparable low heat build-up property and better resiliency and elongation properties as compared with rubbers compounded with a conventional FEF (N 550) class soft carbon black and at the same time had high reinforcing properties, such as hardness, tensile strength and abrasion resistance, far better than those of the same FEF-compounded rubber, and especially the hardness the tensile strength were almost comparable to those by HAF (N 330) class hard carbon black.

Of the comparative examples, the Run No. 5 was an example in which a high-tinting strength carbon black was compounded as in Japanese Patent No. 1032175. In this comparative example, a low heat build-up and a high reinforcing property comparable to those in this invention could be furnished. However, because the Dst mode diameter was above a value defined by $2.65 \times dn + 0.64 \times DBP - 27.56$, the Mooney viscosity as a characteristic of an unvulcanized rubber became higher than that in Examples of this invention (compared with Run No. 4), so that overall evaluation by a Garvey die extrusion which was an index of milling and extrusion became poor. Further, in Run No. 6, no increase in reinforcing property could be obtained because the Dst mode diameter did not satisfy the requirements of this invention and, besides, the tint strength level was low.

What is claimed is:

1. A rubber composition prepared by compounding 100 parts by weight of a rubber component with 25 to 250 parts by weight of carbon black which belongs to a furnace carbon black having the property range of an electron-microscopic average particle diameter (dn) of above 31 millimicron, an iodine adsorption number of 35 to 60 mg/g, and a dibutyl phthalate absorption number (DBP) of 90 to 150 ml/100 g, and which has a selected property in that the Dst mode diameter (mμ) is below the value obtained from the following equation:

$$Dst = 2.65 \times dn + 0.64 \times DBP - 27.56.$$

2. A rubber composition as set forth in claim 1, wherein 40 to 80 parts by weight of the carbon black is compounded with 100 parts by weight of the rubber component.

3. A rubber composition as set forth in claim 1, wherein the rubber component is selected from the group consisting of natural rubber, styrene/butadiene rubber, polybutadiene rubber, isoprene rubber and butyl rubber.

4. A rubber composition as set forth in claim 1, wherein the carbon black is produced by pyrolyzing a hydrocarbon feedstock in a reaction zone with a combustion gas stream produced by burning a hydrocarbon fuel in a combustion chamber under conditions in which the swirling power of the combustion air blown into said reaction zone is about 0.6 in terms of a swirl number, and the residence time of the pyrolysis product in the furnace is 340 to 380 milliseconds.

5. A rubber composition as set forth in claim 1, wherein the carbon black is produced in a furnace consisting of a cylindrical combustion chamber with a converged downstream side, a reduced diameter portion contiguous to said downstream side of the combustion chamber, a gradually enlarging, tapered reaction zone contiguous to said reduced diameter portion, and a cylindrical wind box contiguous to said reaction zone.

* * * * *

UNITED STATES PATENT AND TRADEMARK OFFICE
CERTIFICATE OF CORRECTION

PATENT NO. : 4,500,672
DATED : February 19, 1985
INVENTOR(S) : HIROAKI SUZUKI ET AL It is certified that error appears in the above-identified patent and that said Letters Patent is hereby corrected as shown below:

On the cover page, Item [30], "October 11, 1982" should be --- November 10, 1982 ---.

Signed and Sealed this

First Day of October 1985

[SEAL]

Attest:

DONALD J. QUIGG

Attesting Officer

Commissioner of Patents and Trademarks—Designate